(12) United States Patent
Tsirkin et al.

(10) Patent No.: US 10,956,189 B2
(45) Date of Patent: Mar. 23, 2021

(54) METHODS FOR MANAGING VIRTUALIZED REMOTE DIRECT MEMORY ACCESS DEVICES

(71) Applicant: Red Hat Israel, Ltd., Ra'anana (IL)

(72) Inventors: Michael Tsirkin, Raanana (IL); Marcel Apfelbaum, Afula (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 283 days.

(21) Appl. No.: 14/621,445

(22) Filed: Feb. 13, 2015

(65) Prior Publication Data
US 2016/0239323 A1 Aug. 18, 2016

(51) Int. Cl.
*G06F 9/46* (2006.01)
*G06F 9/455* (2018.01)

(52) U.S. Cl.
CPC .......... *G06F 9/45558* (2013.01); *G06F 2009/45583* (2013.01); *G06F 2009/45595* (2013.01)

(58) Field of Classification Search
CPC ....... G06F 9/45558; G06F 2009/45583; G06F 2009/45595
USPC .......................................................... 718/1
See application file for complete search history.

(56) References Cited

U.S. PATENT DOCUMENTS

| | | | |
|---|---|---|---|
| 7,702,826 B2 | 4/2010 | Oztaskin et al. | |
| 7,984,108 B2 | 7/2011 | Landis et al. | |
| 7,987,469 B2* | 7/2011 | Magro | G06F 9/45533 711/203 |
| 8,327,355 B2 | 12/2012 | Dow et al. | |
| 8,527,693 B2 | 9/2013 | Flynn et al. | |
| 8,549,241 B2 | 10/2013 | Scales et al. | |
| 8,595,724 B2* | 11/2013 | Arcese | G06F 8/60 707/E17.001 |
| 8,631,170 B2 | 1/2014 | Tsirkin et al. | |
| 8,930,507 B2* | 1/2015 | Schmidt | G06F 9/544 709/220 |
| 9,158,940 B1* | 10/2015 | Suit | G06F 21/78 |
| 9,354,933 B2* | 5/2016 | Sharp | G06F 9/5016 |

(Continued)

OTHER PUBLICATIONS

Nadav Amit et al., "vIOMMU: Efficient IOMMU Emulation", Technion & IBM Research; Technion, http://www.mulix.org/pubs/iommu/viommu.pdf.

(Continued)

*Primary Examiner* — Bradley A Teets
(74) *Attorney, Agent, or Firm* — Haynes and Boone LLP (57) ABSTRACT

A method performed by a physical computing system includes, with a hypervisor, presenting a virtualized Remote Direct Memory Access (RDMA) device to a guest, with the hypervisor, allocating a portion of total guest memory to the guest, with the hypervisor, determining a memory threshold for the guest, the memory threshold being based on a number of virtual machines managed by the hypervisor and a size of total guest memory, with the hypervisor, receiving from the guest, a first request to register a first size sub-portion of the portion of total guest memory to the virtualized RDMA device, and with the hypervisor, in response to determining that the first size sub-portion exceeds the memory threshold, returning a notification to the guest, the notification indicating that the first request failed. The first size sub-portion is less than the portion of total guest memory.

13 Claims, 5 Drawing Sheets

(56) References Cited

U.S. PATENT DOCUMENTS

| | | | |
|---|---|---|---|
| 9,442,750 B2* | 9/2016 | Ganesan | G06F 9/5077 |
| 2004/0225719 A1* | 11/2004 | Kisley | G06F 3/061 |
| | | | 709/212 |
| 2005/0076155 A1* | 4/2005 | Lowell | G06F 9/45537 |
| | | | 710/1 |
| 2007/0083862 A1* | 4/2007 | Wooldridge | G06F 12/1081 |
| | | | 718/1 |
| 2008/0082696 A1* | 4/2008 | Bestler | G06F 9/45533 |
| | | | 709/250 |
| 2010/0083247 A1* | 4/2010 | Kanevsky | G06F 13/28 |
| | | | 718/1 |
| 2011/0289502 A1* | 11/2011 | Moriki | G06F 13/36 |
| | | | 718/1 |
| 2012/0072906 A1 | 3/2012 | Tsirkin et al. | |
| 2012/0167079 A1* | 6/2012 | Banerjee | G06F 1/30 |
| | | | 718/1 |
| 2012/0290765 A1* | 11/2012 | Durrant | G06F 12/023 |
| | | | 711/6 |
| 2013/0067122 A1* | 3/2013 | Pavlov | G06F 13/28 |
| | | | 710/22 |
| 2013/0254368 A1 | 9/2013 | Guay et al. | |
| 2013/0326179 A1 | 12/2013 | Tsirkin et al. | |
| 2013/0339568 A1* | 12/2013 | Corrie | G06F 12/023 |
| | | | 711/6 |
| 2014/0025890 A1* | 1/2014 | Bert | G06F 12/0842 |
| | | | 711/118 |
| 2014/0026134 A1* | 1/2014 | Warfield | G06F 9/5077 |
| | | | 718/1 |
| 2014/0089917 A1* | 3/2014 | Attalla | G06F 9/455 |
| | | | 718/1 |
| 2014/0189682 A1* | 7/2014 | Crudele | G06F 9/45558 |
| | | | 718/1 |
| 2014/0201302 A1* | 7/2014 | Dube | G06F 12/084 |
| | | | 709/212 |
| 2015/0199208 A1* | 7/2015 | Huang | G06F 9/45533 |
| | | | 718/1 |
| 2015/0319250 A1* | 11/2015 | Vasudevan | H04L 29/08 |
| | | | 709/228 |
| 2016/0328333 A1* | 11/2016 | Dong | G06F 12/02 |

OTHER PUBLICATIONS

"Index.php" VMware, Inc., 2014, https://labs.vmware.com/author/dwalcoff.

Laura Novich et al., "Red Hat Enterprise Linux 7 Virtualization Deployment and Administration Guide", 2014, Red Hat Customer Content Services, https://access.redhat.com/documentation/en-US/Red_Hat_Enterprise_Linux/7/pdf/Virtualization_Deployment_and_Administration_Guide/Red_Hat_Enterprise_Linux-7-Virtualization_Deployment_and_Administration_Guide-en-US.pdf.

Ben Archer et al., "System x Virtualization Strategies", Feb. 2010, IBM, http://www.redbooks.ibm.com/redpaper/pdfs/redp4480.pdf.

* cited by examiner

METHODS FOR MANAGING VIRTUALIZED REMOTE DIRECT MEMORY ACCESS DEVICES

BACKGROUND

The present disclosure relates generally to virtual systems, and more particularly, to management of remote direct memory access (RDMA) devices within virtual systems.

A host machine (e.g., computer or server) is a computing system that is typically enabled to simultaneously run one or more virtual machines, where each virtual machine may be used by a local or remote client. The host machine allocates a certain amount of execution time from the host's physical processors to each of the virtual processors. Each virtual machine may use the allocated resources to execute applications, including operating systems known as guest operating systems.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc. It is desirable to find methods and systems to improve the operating efficiency of such virtual systems.

SUMMARY

A method performed by a physical computing system includes, with a hypervisor, presenting a virtualized Remote Direct Memory Access (RDMA) device to a guest, with the hypervisor, determining a memory threshold for the guest, the memory threshold being based on a number of virtual machines managed by the hypervisor and a size of total guest memory, with the hypervisor, receiving from the guest, a first request to register a first size sub-portion of the portion of total guest memory to the virtualized RDMA device, and with the hypervisor, in response to determining that the first size sub-portion exceeds the memory threshold, returning a notification to the guest, the notification indicating that the first request failed. The first size sub-portion is less than the portion of total guest memory.

A method performed by a computing system includes with a guest system, being provided with a virtualized Remote Direct Memory Access (RDMA) device, with the guest system, sending to a hypervisor, a first request to register a first size portion of guest memory with the virtualized RDMA device, and with the guest system, receiving from the hypervisor, a notification indicating that the first request has failed. The notification message is received as a result of the first size portion exceeding a memory threshold determined by the hypervisor based on a number of virtual machines managed by the hypervisor and a size of total guest memory.

A method performed by a physical computing system includes with a hypervisor, presenting a virtualized Remote Direct Memory Access (RDMA) device to a guest, with the hypervisor, allocating a portion of total guest memory to the guest, with the hypervisor, determining a memory threshold for the guest, the memory threshold being based on a number of virtual machines managed by the hypervisor and a size of the total guest memory, with the hypervisor, receiving from the guest, a first request to register a first size sub-portion of the portion of total guest memory to the virtualized RDMA device, with the hypervisor, in response to determining that the first size sub-portion does not exceed the memory threshold, pinning the first size sub-portion to the host memory and registering the virtualized RDMA device to the first size sub-portion, and with the hypervisor, in response to determining that the first size sub-portion exceeds the memory threshold, returning a notification to the guest, the notification indicating that the first request failed. The first size sub-portion is less than the available guest memory for the guest.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

Some virtualization platforms provide a feature known as "memory overcommit," where the hypervisor may allocate memory to virtual machines that exceeds the amount of physical memory on the host machine. For example, a hypervisor executing on a server with two gigabytes of physical memory might allocate one gigabyte each to four virtual machines hosted by the server. In virtualized systems with memory overcommit, pages of memory may be swapped to and from storage (e.g., a storage device such as a magnetic hard disk, a Universal Serial Bus (USB) solid state drive, a Redundant Array of Independent Disks (RAID) system, a network attached storage (NAS) array, etc.) as necessary, in a manner similar to virtual memory in conventional non-virtualized computer systems.

Another tool used by computing devices is direct memory access (DMA). A DMA enabled device has the ability to write directly to system memory without involving the Central Processing Unit (CPU). Typically, writing to memory causes the CPU to switch to a context in which it receives data from a device and instructs the memory system to write that data into memory. But, DMA devices bypass this step by writing directly to a portion of memory that has been designated for use by a particular application. For example, an application that is communicating with a remote device may utilize a DMA enabled network card to allow the remote device to write directly to memory associated with that application. Use of DMA by a remote system is referred to as Remote Direct Memory Access (RDMA).

As described above, in the case of a virtual machine, guest memory, which is a portion of host memory designated for use by a guest, may be swapped with longer term storage to allow for memory overcommit. But, this creates problems when using RDMA systems. Thus, to use RDMA devices, a hypervisor will typically pin all of guest memory to the host memory. This means that the guest memory that has been pinned cannot be swapped out. If multiple virtual machines being hosted by the same host machine use RDMA devices and thus have their respective portions of guest memory pinned to the host memory, then memory overcommit cannot be used.

According to principles described herein, methods for virtualized RDMA management allow for memory overcommit to be used while using RDMA devices. According to one example, a hypervisor exposes a virtual RDMA device to the guest. When the guest requests a certain size portion of memory to be registered with the RDMA device, the hypervisor determines whether that size exceeds a memory threshold. If the size does in fact exceed the memory threshold, then the hypervisor sends a notification to the guest, indicating that the request has failed. This is done despite the fact that there may in fact be enough available guest memory for the request. The application running on the guest that is associated with the request will typically have a mechanism to recover from such a notification by sending another request to register a smaller amount of memory with the RDMA device.

If the hypervisor determines that a request does not exceed the memory threshold, then the hypervisor will pin only the requested amount of memory to the host memory, rather than pin all of guest memory to the host memory. The hypervisor will also register the requested portion of memory with the RDMA device as requested and the guest can proceed to use the RDMA device as normal. The memory threshold can be specified for each virtual machine managed by the host system. The memory thresholds for each of the virtual machines can be specified such that the sum of all memory thresholds does not exceed the size of total guest memory. Total guest memory refers to the portion of host memory available for use by guests. Guest memory refers to a portion of total guest memory that has been designated for use by a specific guest.

Figure 1:
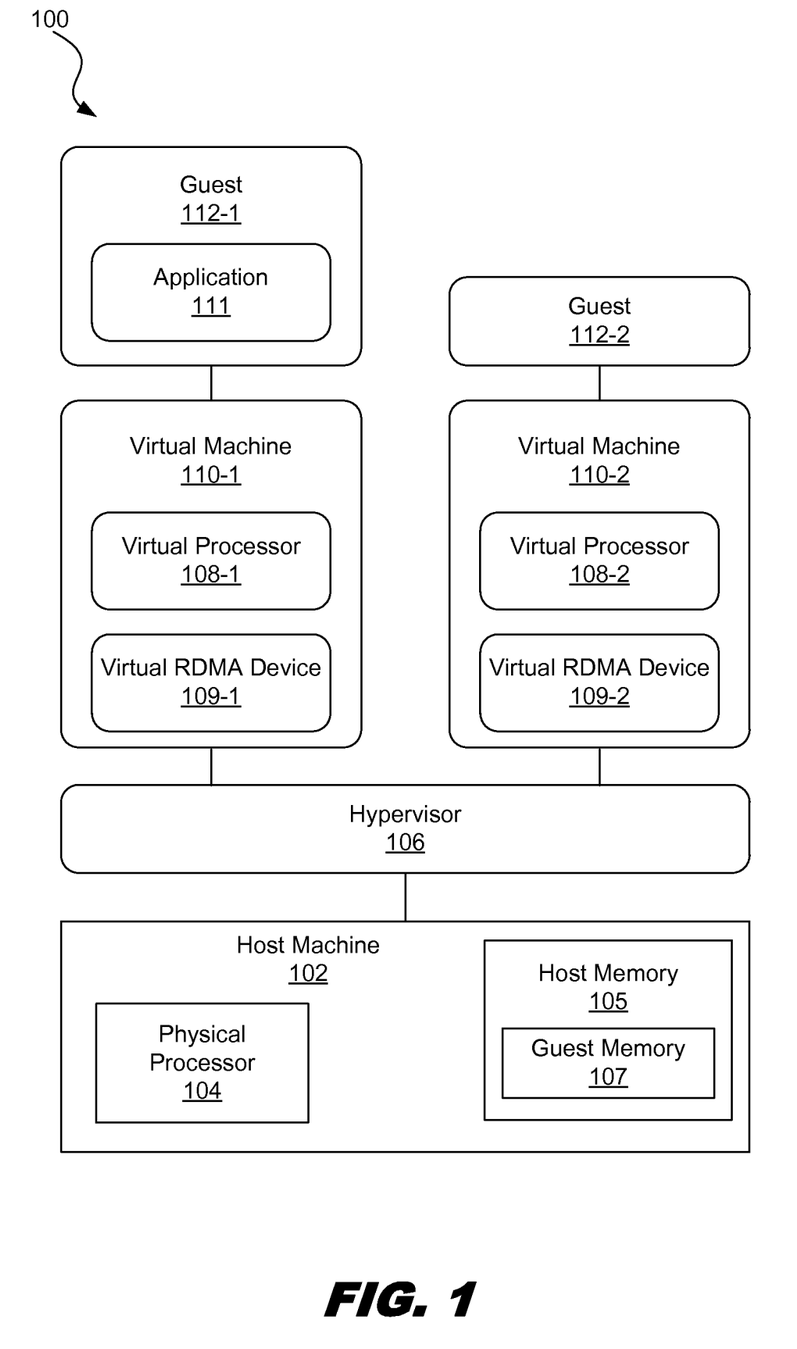
FIG. 1 is a diagram showing an illustrative host system running a plurality of virtual machines, according to one example of principles described herein.

FIG. 1 is a diagram showing an illustrative system 100 involving a plurality of virtual machines 110. According to the present example, a physical system, such as a host machine 102 includes hardware such as a processor 104 and a host memory 105. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 refers to the working memory of the host system. Working memory is typically Random Access Memory (RAM) and is designed for speed. Working memory is often a volatile form of memory, meaning that it loses its data when power is no longer supplied. The host system 102 may, however, have other forms of memory available such as solid state drives, NAS drives, RAID drives, and other non-volatile storage devices. The various types of memory may store information in the form of software and data. The host memory 105 may designate various blocks of memory for use by the hypervisor 106 or for use by the guests 112 using the virtual machines 110. These blocks of memory may be ranges of physical memory addresses or virtual memory addresses.

A certain portion of the host memory 105 is dedicated to total guest memory 107. The total guest memory 107 may be made available for multiple guests 112 to use. As described above, more total guest memory 107 than is actually available may be provided to the guests. Doing so is referred to as memory overcommit. When using memory overcommit, not all memory allocated for a particular guest is used at the same time. But, if enough guests are using enough of their allocated guest memory such that more than the allocated amount of total guest memory 107 is used, then some portions of guest memory can be paged out to a longer term storage device such as a solid state hard drive.

The host machine 102 also includes a processor 104 for executing software (e.g., machine readable instructions) and using or updating data stored in memory 105. The software may include an operating system, the hypervisor 106 and various other software applications. The processor 104 may include one or more processors acting in concert.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The virtual machines 110-1 may also include virtual RDMA devices 109. As will be described in further detail below, an RDMA enabled device has the ability to write directly to memory that has been allocated for a specific application. Thus, a virtual RDMA device has the ability to write directly to a portion of guest memory for a specific guest 112 that has been allocated for a particular application 111 run by the virtual machine 110-1. This is done without utilizing the resources of the virtual CPU 108-1.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

During normal operations, a virtual processor 108 will switch to a read/write context when transferring data to or from guest memory. For example, if a virtual network card associated with the virtual machine 110 is receiving data from a different computing device (physical or virtual), then the processor will typically get involved by switching from its current context to a read/write context in order to copy the data received by the virtual network card to a portion of guest memory 107. However, through use of an RDMA enabled virtual network device, data can be written directly to a specific portion of guest memory 107. Thus, the virtual processor does not have to spend processing time transferring data to the guest memory 107.

Figure 2:
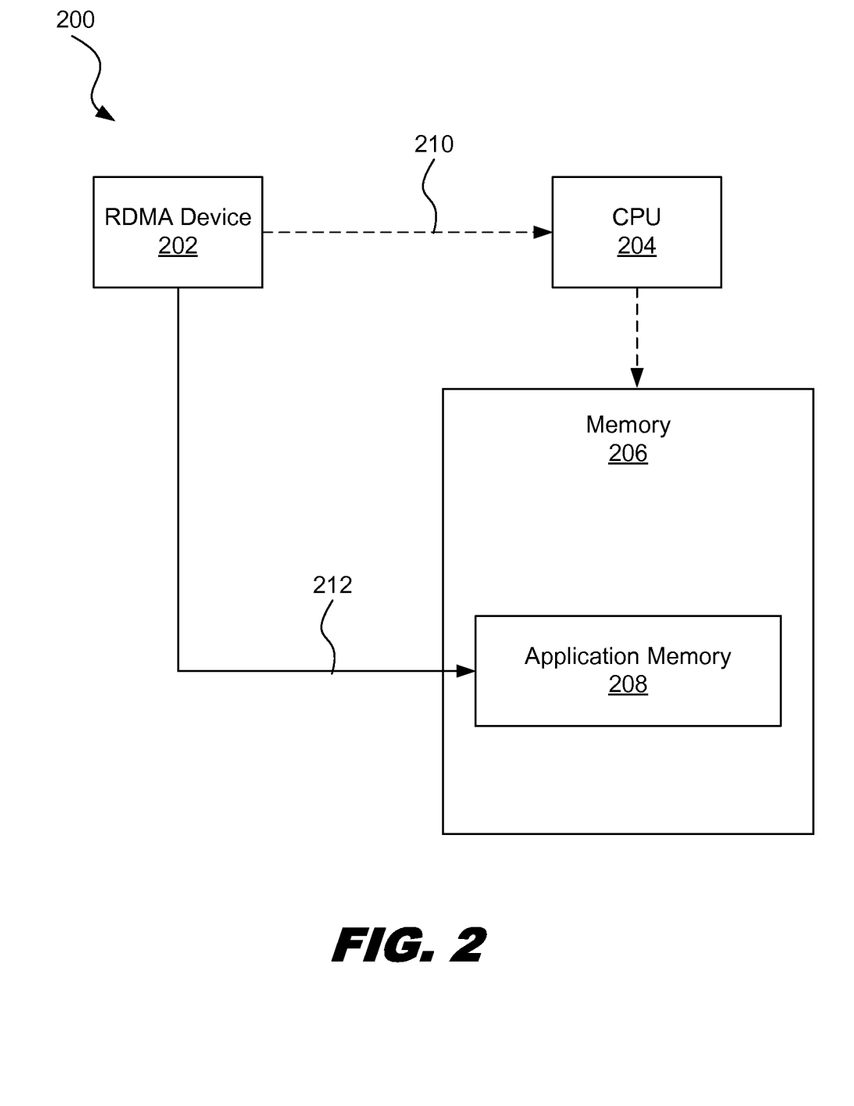
FIG. 2 is a diagram illustrating remote direct memory access, according to one example of principles described herein.

FIG. 2 is a diagram 200 illustrating remote direct memory access. According to the present example, remote direct memory access involves an RDMA enabled device 202, a CPU 204, and memory 206 having a portion dedicated to a specific application 208. When an application is executed, the application will typically request that the computing system reserve a portion of memory for the application to use. Such a portion will be referred to as application memory 208.

Without using direct memory access, data takes path 210. Specifically, data received by device 202 that is intended for application memory 208 makes its way through processor caches and processor registers of the CPU 204. The CPU will then execute a store instruction to store that data in application memory 208. If the CPU is being used to perform other tasks, then the CPU 204 will have to perform a context switch to store the data in memory 206, thus using valuable processing resources.

But, when using direct memory access, the data takes path 212 and transfers the data received by the RDMA device 202 directly to application memory. This may be done by allowing the RDMA device to register a portion of memory 206 to which it can read or write data. That portion may correspond to the application memory 208. As part of the RDMA registration process, the RDMA device may be provided with the memory address range to which it has access. The RDMA device 202 may also be provided with a registration key (RKEY) that is used to ensure that the RDMA device is authorized to read or write to application memory 208. Thus, no processing resources of the CPU 204 are used.

The RDMA process described above can be applied to virtual machines as well. Thus, in the case of virtual machines, the memory 206 is guest memory (e.g., 107, FIG. 1) and the processor 204 is a virtual processor (e.g. 108, FIG. 1). The RDMA device 202 can also be a virtualized device.

Figure 3:
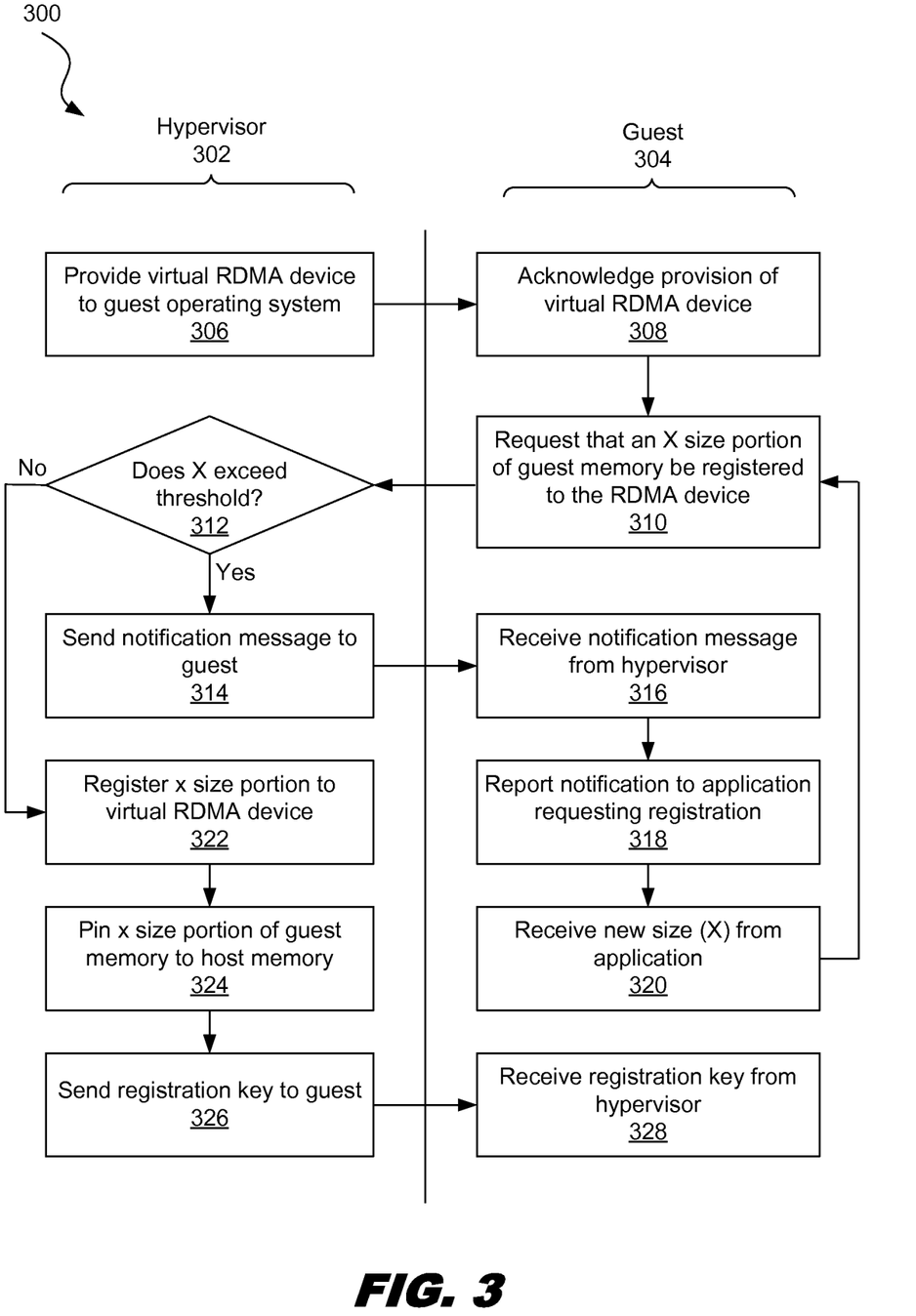
FIG. 3 is a flowchart showing an illustrative method for managing virtualized RDMA devices, according to one example of principles described herein.

FIG. 3 is a flowchart showing an illustrative method for managing virtualized RDMA devices. According to the present example, the method 300 includes steps performed by the hypervisor 302 and steps performed by a guest 304. The method 300 includes a step 306 performed by the hypervisor 302 for providing a virtual RDMA device to a guest 304. The virtual RDMA device may be part of the virtual machine on which the guest resides. Or, the virtual RDMA device may be associated with a different entity. At step 308, the guest 304 acknowledges provision of the virtual RDMA device at step 308.

At step 310, the guest 304 requests an X size portion of guest memory be registered to the RDMA device. For example, an application associated with the guest may ask for 500 megabytes of guest memory for use by that application. Additionally, the application may request that the RDMA device have access to that memory.

At step 312, the hypervisor 302 receives the request and determines whether the size of X exceeds a memory threshold. The memory threshold is based on the number of virtual machines being managed by the hypervisor as well as the size of total guest memory. More specifically, a memory threshold can be assigned to each virtual machine managed by the hypervisor. The memory thresholds are assigned such that the total of all memory thresholds does not exceed the amount of free guest memory. Total guest memory refers to the amount of memory that is available for use by guests. Specifically, host memory will be used in part by the physical machine itself as well as for the hypervisor. The remaining portions of memory can be made available to guests being hosted by the host machine. There may in fact be enough total guest memory available to service the request. But, because the request exceeds this predefined memory threshold, the request fails, even though there really is enough memory to service the request.

If X does in fact exceed the memory threshold for the virtual machine on which the guest 304 operates, then the hypervisor will send a notification to the guest at step 314. This notification may be a standard message that tells the guest that the request failed. Such notifications are typically sent when there is not enough guest memory for the amount requested. Such notification may be sent, even though there may in fact be enough guest memory.

At step 316, the guest 304 receives the notification from the hypervisor 302. At step 318, the guest informs the application associated with the request of the received error.

Many applications are designed to recover from this error. Specifically, applications are often designed to respond to such an error by requesting a smaller amount of memory and then making adjustments within the application to operate using that smaller amount of memory. At step 320, the guest receives the new size X from the application, which is a smaller amount, and returns to step 310.

This time, at step 310, the guest 304 requests that a new size X portion of guest memory be registered with the RDMA device. For example, the new size X may be 300 megabytes instead of 500. If, for example, the memory threshold is 400 megabytes, then the new size X portion of memory does not exceed the memory threshold. Thus, at step 312, the method proceeds to step 322.

At step 322, the hypervisor registers the x size portion of guest memory with the virtual RDMA device 322. Thus, the RDMA device has the ability to read or write directly to and from the registered portion of guest memory.

At step 324, the hypervisor pins the registered portion of guest memory to the host memory. This means that the registered portion of guest memory cannot be swapped out to a non-volatile memory system. Allowing such swapping in concert with RDMA techniques could potentially corrupt the memory. Instead of pinning all guest memory associated with the guest 304, only the requested portion of memory is pinned. Thus, the remaining portions of guest memory associated with the guest 304 can be swapped out as desired to allow for memory overcommit techniques to be used.

At step 326 the hypervisor sends the registration key to the guest. At step 328, the guest 304 receives the registration key from the hypervisor 328. The guest can then give this key to other entities that may wish to use the RDMA device to access the registered portion of guest memory. For example, in the case that the virtual RDMA device is a virtual network card, then other entities communicating with the guest through the virtual network card may wish to write directly to the registered portion of guest memory. For example, the application running by the guest may be a client portion of a client/server application. The client portion of the application may provide the server portion with the registration key (through secure transfer protocols). Using the registration key, the server application can remotely access the registered portion of guest memory through the virtual RDMA device. The registration key is used to ensure that the server does in fact have authorized access to the registered portion of memory.

Figure 4:
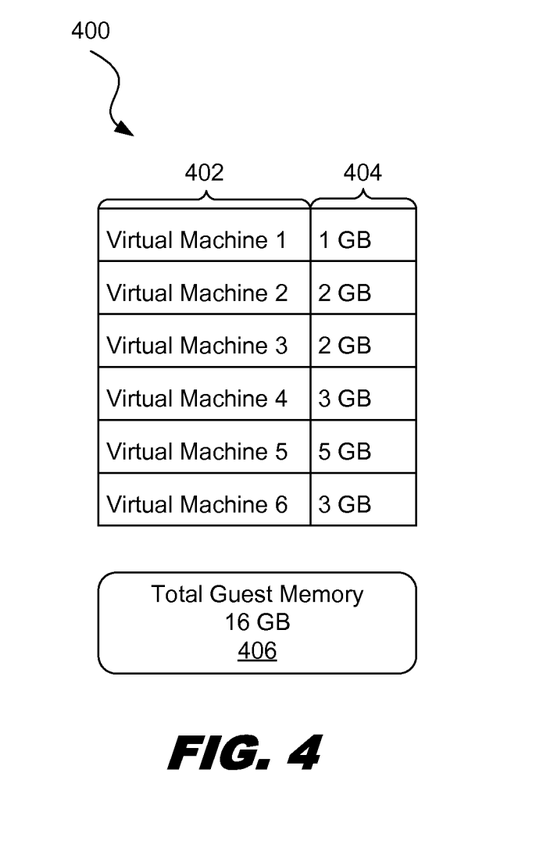
FIG. 4 is a diagram showing an illustrative assignment of RDMA memory thresholds for virtual machines managed by a hypervisor, according to one example of principles described herein.

FIG. 4 is a diagram showing an illustrative assignment of RDMA memory thresholds for virtual machines managed by a hypervisor. In one example, the hypervisor may assign a similar memory threshold to each virtual machine managed by that hypervisor. For example, if there is a total of 4 gigabytes of free guest memory and four virtual machines managed by the hypervisor, then each virtual machine may have a memory threshold of 1 gigabyte.

In some examples, however, the hypervisor may assign different memory thresholds to the virtual machines managed by that hypervisor. The table 400 is an example of how such memory thresholds may be assigned. In this example, there are six virtual machines represented in the first column 402. The second column 404 shows the memory threshold for the corresponding virtual machine. The total guest memory 406 in this example is 16 gigabytes. Virtual machine 1 has a memory threshold of 1 gigabyte, virtual machine 2 has a memory threshold of 2 gigabytes, virtual machine 3 also has a memory threshold of 2 gigabytes, virtual machine 4 has a memory threshold of 3 gigabytes, virtual machine 5 has a memory threshold of 5 gigabytes, and virtual machine 6 has a memory threshold of 3 gigabytes. The sum of all memory thresholds is equal to the total guest memory 406.

The memory thresholds may be set dynamically. For example, the memory thresholds can be updated as the host machine commissions or decommissions virtual machines. In some cases other factors may affect how the memory thresholds are allocated. In some cases, the amount of free guest memory may be reduced. In such case, the memory thresholds may be adjusted.

Figure 5:
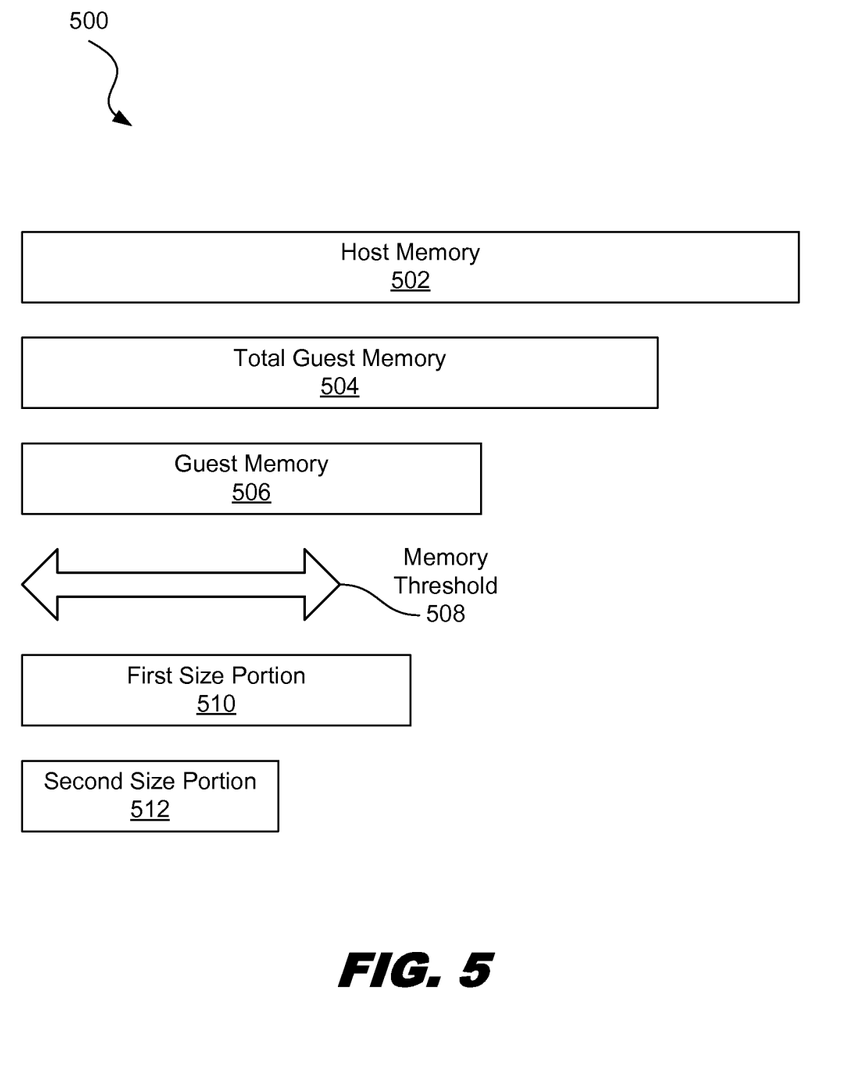
FIG. 5 is a diagram showing an illustrative comparison of sizes of portions of memory used in RDMA registration, according to one example of principles described herein.

FIG. 5 is a diagram showing an illustrative comparison of sizes of portions of memory used in RDMA registration. In the present example, there is a total amount of host memory 502. As described above, some of that memory is used by the hypervisor, and some for the host machine itself. The remaining portions of host memory are referred to as total guest memory 504.

Within total guest memory 504, there are portions assigned to specific guests. Thus, guest memory 506 represents a portion of total guest memory 504 assigned to a specific guest. However, guest memory 506 does not necessarily correspond to specific addresses of total guest memory 504. As described above, memory overcommit techniques may be used.

The memory threshold 508 is less than the total guest memory 504 as well as the guest memory 506. In this example, a first size portion 510 of memory is requested by an application. The first size portion is thus a sub-portion of the guest memory 506. But, because the first size portion 510 of memory exceeds the memory threshold 508, such a request is denied, even though the first size portion 510 is less than the guest memory 506. The second size portion 512, however, is less than the memory threshold 508 and thus a request for such amount of memory to be registered to an RDMA device is accepted. It is understood that FIG. 5 does not necessarily represent scaled sizes of memory.

Some examples of processing systems described herein may include non-transient, tangible, machine readable media that include executable code that when run by one or more processors (e.g., processor 104) may cause the one or more processors to perform the processes of the methods described above. Some common forms of machine readable media that may include the processes of the methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:
1. A method performed by a physical computing system, the method comprising:
   with a hypervisor, presenting a virtualized Remote Direct Memory Access (RDMA) device to a guest;

with the hypervisor, allocating a portion of total guest memory to the guest, the total guest memory being host memory available for use by a plurality of guests supported by the hypervisor, wherein each of the plurality of guests has an individual memory threshold wherein a sum of the individual memory thresholds for each of the plurality of guests is not greater than a size of the total guest memory;

with the hypervisor, determining a memory threshold for the guest, the memory threshold being based on a number of virtual machines managed by the hypervisor and a size of the total guest memory, the memory threshold being less than the portion of total guest memory, wherein the memory threshold is dynamically updated as a host machine commissions and decommissions virtual machines belonging to the number of virtual machines;

with the hypervisor, receiving from the guest, a first request to register a first size sub-portion of the portion of total guest memory for use by the virtualized RDMA device;

with the hypervisor, in response to determining that the first size sub-portion exceeds the memory threshold, returning a notification to the guest, the notification indicating that the first request failed, wherein the first size sub-portion is less than the portion of total guest memory, wherein the guest informs an application associated with the first request that the first request failed, wherein in response to informing the application associated with the first request, the guest receives a second size sub-portion request from the application and the guest sends a second request to the hypervisor to register a second size sub-portion of memory to the virtualized RDMA device, the second size sub-portion being smaller than the first size sub-portion; and with hypervisor, in response to determining that the second size sub-portion does not exceed the memory threshold, registering the virtualized RDMA device with the second size sub-portion, the second size sub-portion based on the second size sub-portion request.

2. The method of claim 1, further comprising, with the hypervisor, in response to determining that a second size sub-portion does not exceed the memory threshold, pinning the second size sub-portion of guest memory to host memory and registering the virtualized RDMA device to the second size sub-portion.

3. The method of claim 1, further comprising, with the guest, receiving the notification.

4. The method of claim 1, further comprising, returning a registration key to the guest in response to determining that a second size sub-portion does not exceed the memory threshold.

5. The method of claim 1, wherein the virtualized RDMA device comprises a virtual network card.

6. A method performed by a physical computing system, the method comprising:
   with a guest system, being provided with a virtualized Remote Direct Memory Access (RDMA) device;
   with the guest system, sending to a hypervisor, a first request to register a first size portion of guest memory for use by the virtualized RDMA device;
   with the guest system, receiving from the hypervisor, a notification indicating that the first request has failed;
   wherein the notification is received as a result of the first size portion exceeding a memory threshold determined by the hypervisor based on a number of virtual machines managed by the hypervisor and a size of total guest memory, the total guest memory being memory available for use by plurality of guests supported by the hypervisor, the memory threshold being less than a portion of total guest memory allocated to the guest system, wherein each of the plurality of guests has an associated memory threshold wherein a sum of the memory thresholds associated with each virtual machine managed by the hypervisor is not greater than a total amount of available host memory, and wherein the memory threshold is dynamically updated as a host machine commissions and decommissions virtual machines belonging to the number of virtual machines;
   with the guest, informing an application associated with the first request that the first request failed;
   with the guest, receiving a different size from the application, wherein the different size is sent in response to the guest informing the application associated with the first request that the first request failed; and
   with the guest, sending a second request to the hypervisor to register a second size portion of memory to the virtualized RDMA device, the second size portion being smaller than the first sized portion, the second size portion based on the different size.

7. The method of claim 6, further comprising:
   with the hypervisor, receiving the first request from the guest;
   in response to determining that the first size portion exceeds the memory threshold, sending the notification to the guest.

8. The method of claim 6, further comprising:
   with the hypervisor, receiving the second request; and
   with the hypervisor, determining that the second size portion does not exceed the memory threshold.

9. The method of claim 8, further comprising:
   registering the second size portion of guest memory to the virtualize d RDMA device in response to the determining.

10. The method of claim 8, further comprising:
    pinning the second size portion of guest memory to host memory in response to the determining.

11. The method of claim 8, further comprising:
    with the guest, receiving a registration key for the virtualized RDMA device.

12. A method performed by a physical computing system, the method comprising:
    with a hypervisor, presenting a virtualized Remote Direct Memory Access (RDMA) device to a guest;
    with the hypervisor, allocating a portion of total guest memory to the guest, total guest memory being memory available for use by a plurality of guests supported by the hypervisor, wherein each of the number of guests has a memory threshold wherein a sum of the memory thresholds for each of the number of guests is not greater than a size of total guest memory;
    with the hypervisor, determining a memory threshold for the guest, the memory threshold being based on a number of virtual machines managed by the hypervisor and a size of the total guest memory, the memory threshold being less than the portion of total guest memory, wherein the memory threshold is dynamically updated as a host machine commissions and decommissions virtual machines belonging to the number of virtual machines;
    with the hypervisor, receiving from the guest, a first request to register a first size sub-portion of the portion of total guest memory to the virtualized RDMA device;

with the hypervisor, in response to determining that the first size sub-portion does not exceed the memory threshold, pinning the first size sub-portion to host memory and registering the virtualized RDMA device to use the first size sub-portion;

with the hypervisor, in response to determining that a second size sub-portion exceeds the memory threshold, returning a notification to the guest, the notification indicating that a second request failed, wherein the second size sub-portion is less than the size of total guest memory, wherein the guest informs an application associated with the second request that the second request failed, wherein the second size sub-portion is less than the available guest memory for the guest;

with the guest, in response to informing the application associated with the second request, receiving a third size from the application; and with the guest, sending a third request to the hypervisor to register the third size sub-portion of memory to the virtualized RDMA device, the third size sub-portion being smaller than the second size sub-portion, the third size sub-portion based on the third size.

13. The method of claim 12, further comprising:

with the guest, receiving the notification.

* * * * *